(12) United States Patent
Wölki et al.

(10) Patent No.: US 7,118,808 B2
(45) Date of Patent: Oct. 10, 2006

(54) SLIDING BEARING MATERIAL

(75) Inventors: Peter Wölki, Mönchengladbach (DE); Friedrich Harig, Willich (DE); Heinz Haardt, Korschenbroich (DE)

(73) Assignee: Saint-Gobain Performance Plastics Pampus, GmbH, (DE)

( * ) Notice: Subject to any disclaimer, the term of this patent is extended or adjusted under 35 U.S.C. 154(b) by 0 days.

(21) Appl. No.: 10/531,233

(22) PCT Filed: Oct. 8, 2003

(86) PCT No.: PCT/EP03/11095

§ 371 (c)(1), (2), (4) Date: Jul. 11, 2005

(87) PCT Pub. No.: WO2004/036066

PCT Pub. Date: Apr. 29, 2004

(65) Prior Publication Data

US 2005/0260431 A1   Nov. 24, 2005

(30) Foreign Application Priority Data

Oct. 14, 2002 (DE) ................. 102 47 830

(51) Int. Cl.
*B32B 5/28* (2006.01)
*B32B 5/18* (2006.01)
*B32B 3/24* (2006.01)
*B32B 3/26* (2006.01)

(52) U.S. Cl. .......... 428/626; 428/613; 428/615
(58) Field of Classification Search ............ None
See application file for complete search history.

(56) References Cited

U.S. PATENT DOCUMENTS 2,863,025 A   12/1958   Flanagan
3,158,526 A   11/1964   Farnam et al.

(Continued)

FOREIGN PATENT DOCUMENTS

DE   33 04 141 A1   8/1984

(Continued)

OTHER PUBLICATIONS

Database WPI; Section Ch, Week 200239, Derwent Publications Ltd., London, GB; AN 2002-354747, XP002284799.

*Primary Examiner*—Jennifer C. McNeil
*Assistant Examiner*—Jason L. Savage
(74) *Attorney, Agent, or Firm*—Craig A. Fieschko, Esq.; DeWitt Ross & Stevens S.C.

(57) ABSTRACT

The invention relates to a composite material which is to be used in sliding bearings and comprises a metallic support (1) and at least one reinforcement material having an open structure (2). Said support (1) and reinforcement material (2) are connected to each other by means of a metallic connection. An overlay (4) which is a polyethylene(PE)-based layer is provided on the reinforcement material (2) as an additional layer.

28 Claims, 1 Drawing Sheet

U.S. PATENT DOCUMENTS

| | | |
|---|---|---|
| 3,652,409 A | 3/1972 | Mack et al. |
| 4,116,499 A | 9/1978 | Laurizio |
| 4,632,947 A | 12/1986 | Wölki |
| 4,670,089 A | 6/1987 | Hanson |
| 4,862,789 A | 9/1989 | Burgess et al. |
| 5,024,670 A * | 6/1991 | Smith et al. ................. 128/898 |
| 5,229,198 A * | 7/1993 | Schroeder .................... 442/7 |
| 5,686,176 A * | 11/1997 | Adam et al. ................. 428/327 |
| 5,948,479 A * | 9/1999 | Adam et al. ............. 427/388.4 |
| 6,289,640 B1 * | 9/2001 | Ueda et al. ................ 52/167.9 |
| 6,890,594 B1 * | 5/2005 | Iwata et al. ................. 427/239 |

FOREIGN PATENT DOCUMENTS

| | | |
|---|---|---|
| DE | 35 34 242 A1 | 3/1987 |
| DE | 37 36 292 A1 | 5/1989 |
| FR | 2 292 587 | 6/1976 |
| GB | 657 080 | 9/1951 |
| GB | 821 472 | 10/1995 |
| JP | 2001 323115 A | 11/2001 |

\* cited by examiner

SLIDING BEARING MATERIAL

FIELD OF THE INVENTION

The invention relates to a composite material which is to be used in sliding bearings, and comprises a metallic support and at least one reinforcement material having an open structure. Said support and reinforcement material are connected to each other by means of a metallic connection. An overlay is provided on the reinforcement material as an additional layer.

BACKGROUND OF THE INVENTION

Sliding bearing composite materials consisting of a metallic support, a reinforcement material and a plastic overlay are generally known. The metal support and reinforcement material are usually connected in this case by laminating means using a suitable adhesive such as perfluoroalkoxy polymer (PFA).

The reinforcement material in known sliding bearing composite materials usually consists of metal and can be wire mesh, expanded metal or a perforated plate for example.

The overlay in known sliding bearings usually consists of plastics, which have good sliding qualities and at the same time resist high mechanical stress and are particularly temperature-resistant, such as polytetrafluoroethylene (PTFE), fluorinated ethylene propylene (FEP) or polyether ether ketone (PEEK).

Apart from the laminated composite materials, those wherein the metallic support and the reinforcement material are connected to each other by means of a metallic connection are also known. Thus for example U.S. Pat. No. 5,229,198 describes a sliding bearing composite material consisting of a metallic support and wire mesh coated with polytetrafluoroethylene (PTFE), which is connected to the support by means of welding. Composite materials manufactured in this way are characterized by a bearing free from play and improved load-carrying capacity of the bearing. In addition, such a composite material can be formed better in comparison to laminated materials.

If the known heavy duty and temperature-resistant fluorinated plastics such as PTFE are used in the overlay of sliding bearings, their high manufacturing costs are disadvantageous. So for example PTFE is only moldable by means of relatively costly sintering. Furthermore there is a need for environmentally-compatible materials as an alternative to PTFE.

SUMMARY OF THE INVENTION

An underlying object of the invention, inter alia, is to create a composite material which is to be used in sliding bearings, that on the one hand can be manufactured and disposed of as waste economically and environmentally-friendly and on the other hand is mechanically strong and temperature-resistant. Further objects of the invention will become apparent from the following description and the examples.

These and further objects are achieved according to the invention by a composite material, which is to be used in sliding bearings, wherein the overlay is a polyethylene based layer.

Advantageous embodiments of the composite material in accordance with the invention, a corresponding method for its production as well as special use thereof are described in the dependent claims.

Surprisingly, it has been found that composite materials with a polyethylene (PE)-based overlay are extremely strong and temperature-resistant, assuming that metallic support and reinforcement material are connected to each other by means of a metallic connection. At the same time, polyethylene can be manufactured simply and economically, whereby its production and also waste disposal do not represent a burden on the environment.

The polyethylene contained in the overlay of the composite material in accordance with the invention is a thermoplastic material, which has very high abrasion resistance and possesses good sliding qualities.

In comparison to the known plastics, which have been used until now in the production of composite materials for sliding bearings as overlay (PTFE, FEP or PEEK), polyethylene is only durably heat-resistant within a substantially narrower temperature range, that is to say within a range of $-150°$ C. to a maximum of $+90°$. For comparison, PTFE is low-temperature resistant down to $-200°$ C. and durably heat-resistant up to $+260°$ C. For this reason, until now use of polyethylene, which by comparison is relatively not temperature-resistant, has been left out of consideration as material for an overlay in sliding bearings.

However, it has been shown that these negatively regarded characteristics do not represent a disadvantage if the support is connected to the reinforcement material in a metallic way. As a result of the metallic connection, the heat generated in the overlay due to friction can be dissipated to the support in an optimum way. Moreover, because of the open structure of the reinforcement material, if this is interlaced with POLYETHYLENE, the strength and thus the maximum load-capacity of the overlay are additionally increased, which supports the use of polyethylene as overlay material. With regard to mechanical strength and temperature resistance, polyethylene if a metallic connection is used between support and reinforcement material is therefore an equivalent alternative to the plastics used so far.

The crucial advantage however, if polyethylene is used, is economic production and good environmental compatibility. Since a sliding bearing concerns a frequently used and common product, the environmental aspect in particular is very important. Thus waste polyethylene can be incinerated without environmental impact, since only carbon dioxide, carbon monoxide, water and nitro-oxide are given off. Polyethylene is thus a plastic, which with respect to toxicology and environmental impact in regard to production, incineration and waste disposal presents substantially fewer problems than PTFE, for example.

Polyethylene in the sense of this invention is understood to mean all types of polyethylene in the most different densities, hardnesses and compositions. It is particularly advantageous if the overlay is a layer based on high-molecular polyethylene (HMW PE), ultrahigh-molecular polyethylene (UHMW PE) or polyethylene compounds.

HMW PE and/or UHMW PE are distinguished by their high and/or ultrahigh molecular weight of 200,000 to 5,000,000 g/mol and/or 3,000,000 to 6,000,000 g/mol. In this case, a particularly rigid and hard polyethylene which possesses good sliding and wear properties is concerned.

In accordance with a preferred embodiment of the invention the plastic making up the overlay contains polyethylene in a ratio of 5 to 100%, in particular 50 to 100% by weight, more preferably 80 to 100% by weight and most preferably 90 to 100% by weight.

Besides, the overlay can also contain normal additives such as fillers (e.g., glass fiber, carbon, graphite and/or aromatic polyesters). Polyethylene-based plastic compositions, which besides polyethylene also contain fillers such as glass fiber, carbon, graphite and/or aromatic polyesters, are also designated polyethylene compounds (PE compounds).

The aforementioned polyethylene blends and/or blends of polyethylene with other polymers, in particular with fluorinated polymers such as PTFE, PFA, MFA and/or FEP are also conceivable as a plastic composition for the overlay. Blends with polyether ether ketone (PEEK) are also conceivable. In particular blends, which consist of 10 to 99.9% by weight, in particular 40 to 99.9% by weight and particularly preferred 80 to 99.9% by weight polyethylene and remainder made up of fluorinated polymers or polyether ketone, possibly in addition to normal additives, admixtures and fillers (e.g. glass fibre, carbon, graphite and/or aromatic polyesters) are conceivable.

Furthermore, polymer alloys containing polyethylene as a plastic composition for the overlay are also conceivable.

In addition, it is particularly advantageous if the material of the overlay at least partly fills the openings of the reinforcement material. In this way, the overlay is stronger and more tear-resistant. The overlay, measured above the reinforcement material, should have a thickness of 1 µm to 1.5 mm, in particular 5 to 250 µm. Good strength and at the same time optimum heat transfer properties are achieved if the metal support and reinforcement material are connected to each other by means of sintering, welding, soldering and/or galvanizing. Preferably, the connection is made by means of sintering.

The metallic support can consist of any metals, in particular steel, stainless steel, aluminum, bronze, brass, titanium and/or copper or an alloy thereof, and can have any thickness, in particular a thickness of 0.05 to 10 mm. Preferably, the thickness lies within a range of between 0.2 and 3 mm.

The reinforcement material having an open structure is preferably a fabric, in particular wire mesh, expanded metal, fleece, in particular metal fleece, metal foam and/or a perforated plate. Preferably, metal fabric is used. The reinforcement material can consist of metal, in particular bronze, copper, silver, chrome, nickel, zinc, zinc-iron alloy, zinc-nickel alloy and/or aluminum or an alloy thereof. Preferably bronze fabric is used. Also mixed fabrics made of different metals, in particular fabrics mixed from the aforementioned metals, are conceivable. The thickness of the reinforcement material preferably lies within a range of 0.1 to 6 mm, in particular 0.1 to 2 mm.

One or several intermediate layers, in particular metallic intermediate layers, can be arranged between metallic support and reinforcement material. The metallic intermediate layer preferably consists of the same material as the metallic reinforcement material having an open structure. Materials which are particularly suitable for the intermediate layer(s) are copper and/or bronze. The metallic intermediate layer can be applied on the support or the reinforcement material by means of galvanizing and/or plating. The intermediate layer can have a thickness of 1 to 100 µm.

The composite material in accordance with the invention is suitable for use as support material of a sliding bearing, in particular a maintenance-free sliding bearing. The invention accordingly also covers sliding bearings, which contain the composite material according to the invention.

Finally, the invention comprises a corresponding method for the production of a composite material with one or several of the features described above. With this method, the metallic connection between support and reinforcement material is produced by means of sintering, welding, soldering and/or galvanizing. The intermediate layer can be applied by means of plating and/or galvanizing. Advantageously, the overlay can be introduced into the reinforcement material by means of calandering, painting and/or laminating.

BRIEF DESCRIPTION OF THE DRAWINGS

The invention is described in detail below on the basis of an embodiment illustrated in FIG. 1.

DETAILED DESCRIPTION OF PREFERRED VERSIONS OF THE INVENTION

Figure 1:
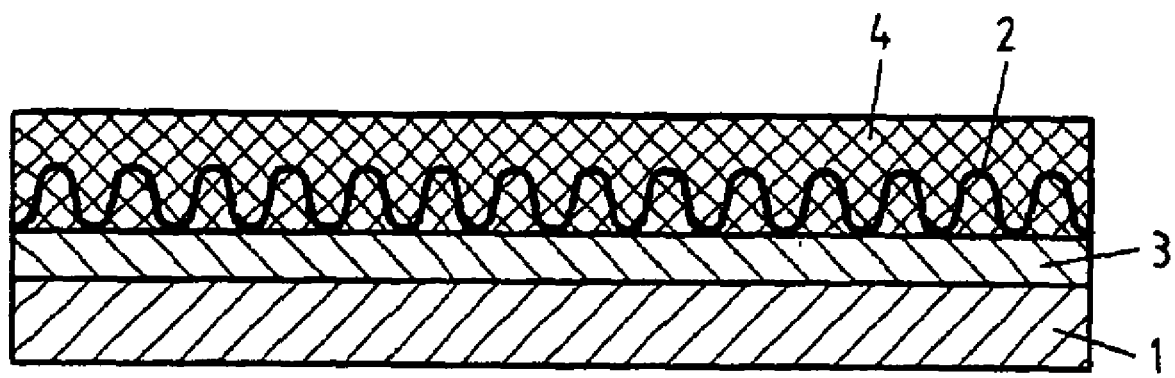

FIG. 1 shows a composite material according to the invention, comprising a metallic support 1, a metallic intermediate layer 3, wire mesh as reinforcement material 2 and finally an overlay 4. The metallic support 1 preferably consists of steel. The metallic intermediate layer 3, which preferably consists of copper or bronze, has been applied by means of galvanizing or plating on the support 1 for example. Wire mesh serving as reinforcement material 2 consists of bronze or copper and is applied by means of sintering. For example an overlay made from polyethylene, which also fills the openings of the reinforcement material 2 is applied on the reinforcement material 2 by means of calandering or laminating. Such a composite material is highly suitable after corresponding shaping for use as support material in sliding bearings.

If the reinforcement material 2 is connected with the underlying metal layer 1.3 by means of sintering, good load-carrying capacity of the bearing is achieved. The following tables reproduce some compression tests with sintered bronze —(CuSn6-) fabric with a batch press (pressure 4.1 Mpa, 380° C., 2 minutes retention time, cooling to 40° C.). In tests 3.3 and 3.4 both fine fabric (width 0.112 mm, wire diameter 0.08 mm) and coarse fabric (width 0.4 mm, wire diameter 0.25 mm) were used.

TABLE 1

| Test | Material Structure | Thickness (mm) | Size (cm$^2$) | Pressure (bar) | Laminate Thickness (mm) | Static pressure test (N/mm$^2$) |
|---|---|---|---|---|---|---|
| 2.1 | Coarse fabric - bronze plating (calandered) | 0.676 | 13.17 × 2.56 | 7 | 0.705 | 200–220 |
| 2.2 | Coarse fabric - bronze plating (not calandered) | 0.936 | 10.11 × 2.56 | 6 | 0.934 | 100–150 |

TABLE 1-continued

| Test | Material Structure | Thickness (mm) | Size (cm²) | Pressure (bar) | Laminate Thickness (mm) | Static pressure test (N/mm²) |
|------|-------------------|----------------|------------|----------------|------------------------|------------------------------|
| 3.3 | Fine fabric, coarse fabric, bronze plating | 0.995 | 11.67 × 2.53 | 7 | 1.008 | |
| 3.4 | Coarse fabric, fine fabric bronze plating | 1.011 | 14.91 × 2.54 | 8 | 1.007 | |
| 3.6 | Coarse fabric bare plate | 0.891 | 9.38 × 2.51 | 6 | 0.887 | |

TABLE 2

| Test | Result |
|------|--------|
| 2.1 | Formation of sinter lines and cavities with undercuts |
| 2.2 | Formation of sinter points and a hollow-type structure with many anchoring possibilities |
| 3.3 | Formation of sinter points and a hollow-type structure with many anchoring possibilities |
| 3.4 | Formation of sinter points and a hollow-type structure with many anchoring possibilities |
| 3.6 | Formation of sinter points and a hollow-type structure with many anchoring possibilities |

The embodiments described above only have an explanatory function and the invention is not limited to the embodiments given as examples. Rather, the protective scope of the invention is defined by the following patent claims and their legal equivalents.

REFERENCE SYMBOL LIST

1 metallic support
2 reinforcement material
3 metallic intermediate layer
4 overlay

The invention claimed is:

1. A composite material comprising:
   a. a metallic inner support,
   b. at least one outer reinforcement material having an open structure
   c. an overlay layer provided on the outer reinforcement material, wherein the overlay contains polyethylene;
   d. a metallic connection between the outer reinforcement material and the inner support, the metallic connection being defined as an intermediate metallic layer galvanized and/or plated between the inner support and the outer reinforcement material.

2. The composite material of claim 1 wherein the overlay layer contains at least one of:
   a. high-molecular polyethylene,
   b. ultrahigh-molecular polyethylene, and/or
   c. polyethylene compounds.

3. The composite material of claim 1 wherein the material of the overlay layer at least partly fills the openings of the outer reinforcement material.

4. The composite material of claim 1 wherein the overlay layer, as measured above the outer reinforcement material, has a thickness of 5 μm to 1.5 mm.

5. The composite material of claim 1 wherein the overlay layer, as measured above the outer reinforcement material, has a thickness of 100 to 300 μm.

6. The composite material of claim 1 wherein the inner support is formed of at least one of steel, stainless steel, aluminum, bronze, brass, titanium and/or copper.

7. The composite material of claim 1 wherein the inner support has a thickness of 0.05 to 10 mm.

8. The composite material of claim 1 wherein the inner support has a thickness of 0.2 to 3 mm.

9. The composite material of claim 1 wherein the outer reinforcement material is a metal fabric.

10. The composite material of claim 1 wherein the outer reinforcement material is formed of at least one of:
    a. wire mesh,
    b. expanded metal fabric,
    c. metal fleece,
    d. metal foam, and/or
    e. a perforated metal plate.

11. The composite material of claim 1 wherein the outer reinforcement material is formed of at least one of bronze, copper, chrome, nickel, zinc, iron, and/or aluminum.

12. The composite material of claim 1 wherein the outer reinforcement material has a thickness of 0.1 to 6 mm.

13. The composite material of claim 1 wherein the outer reinforcement material has a thickness of 0.2 to 2 mm.

14. The composite material of claim 1 wherein the intermediate metallic layer is formed of at least one of bronze, copper, chrome, nickel, zinc, iron, and/or aluminum.

15. The composite material of claim 1 wherein the intermediate metallic layer has a thickness of 1 to 100 μm.

16. The composite material of claim 1 wherein the overlay layer is calandered, painted, and/or laminated into the outer reinforcement material.

17. The composite material of claim 1 formed into a sliding bearing wherein the overlay layer and/or the outer reinforcement material form the outer sliding surface of the sliding bearing.

18. The composite material of claim 1 wherein the overlay layer contains less than 10% polytetrafluouroethylene.

19. The composite material of claim 18 wherein the overlay layer contains no polytetrafluouroethylene.

20. The composite material of claim 18 wherein the overlay layer contains no fillers formed predominantly of calcium.

21. The composite material of claim 1 wherein the overlay layer contains no calcium carbonate.

22. The composite material of claim 1 wherein the overlay layer contains no calcium carbonate.

23. The composite material of claim 1 wherein:
   a. the outer reinforcement material includes a wire mesh, and
   b. the overlay layer contains less than 10% polytetrafluoroethylene.

24. The composite material of claim 23 wherein the wire mesh contains bronze.

25. The composite material of claim 24 wherein the overlay layer contains no fillers formed predominantly of calcium.

26. A composite material comprising:
   a. a metallic substrate,
   b. an outer layer of porous metallic reinforcement material, the outer layer having connections to the metallic substrate across the surface of the metallic substrate,
   c. a smooth intermediate metallic connecting layer galvanized and/or plated between the substrate and the outer layer, and
   d. an overlay layer situated in the pores of the outer layer, wherein the overlay layer contains polyethylene,
   wherein the outer layer and/or the overlay layer define the outer surface of a bearing.

27. A composite material comprising:
   a. a metallic substrate having an outer surface,
   b. a reinforcing layer of metallic material having:
      i. an inner surface facing the outer surface of the metallic substrate, and
      ii. an opposing outer surface which at least partially defines the outer bearing surface of a sliding structure, wherein:
         (1) voids are defined within a substantial portion of the reinforcing layer, and
         (2) the voids contain polyethylene; and
   c. an intermediate metallic connecting layer having:
      (1) an inner surface joined to the outer surface of the substrate, and
      (2) a smooth outer surface joined to the inner surface of the reinforcing layer.

28. The composite material of claim 27 wherein the intermediate metallic connecting layer is galvanized and/or plated to the outer surface of the substrate.

\* \* \* \* \*